United States Patent [19]

Bottum

[11] Patent Number: 5,088,471

[45] Date of Patent: Feb. 18, 1992

[54] SOLAR HEATING STRUCTURE

[76] Inventor: Edward W. Bottum, 9357 Spencer Rd., Brighton, Mich.

[21] Appl. No.: 510,886

[22] Filed: Apr. 18, 1990

Related U.S. Application Data

[63] Continuation of Ser. No. 339,728, Jan. 15, 1982, abandoned.

[51] Int. Cl.[5] .................................................. F24J 2/34
[52] U.S. Cl. .................................. 126/436; 126/428; 126/432
[58] Field of Search ............... 126/436, 428, 430, 432, 126/433

[56] References Cited

U.S. PATENT DOCUMENTS

| | | | |
|---|---|---|---|
| 2,529,154 | 11/1950 | Hammond et al. | 126/428 |
| 4,220,138 | 9/1980 | Bottum | 126/433 |
| 4,282,333 | 7/1981 | Corliss et al. | 126/433 X |
| 4,313,424 | 2/1982 | Schreyer et al. | 126/433 |
| 4,424,800 | 1/1984 | Ortega | 126/436 X |

Primary Examiner—Larry Jones
Attorney, Agent, or Firm—Bertram F. Claeboe

[57] ABSTRACT

A solar heating system is disclosed which comprises the combination of a refrigerant charged collector positioned exteriorly of a house or other building in exposed relation to the sun's rays, and a heat storage unit located interiorly of the building and connected in a closed loop to the collector. An accumulator is so positioned in the loop as to permit only dry saturated refrigerant to move to the heat storage unit. Coils of helical or serpentine configuration are positioned in spaced parallel relation within the heat storage unit, and louvers may be provided on the heat storage unit to control the amount of heat emanating therefrom. Both passive and active phase change systems are disclosed.

1 Claim, 1 Drawing Sheet

SOLAR HEATING STRUCTURE

This application is a continuation of my co-pending application Ser. No. 339,728 filed Jan. 15, 1982 now abandoned.

BACKGROUND OF THE INVENTION

The present invention relates broadly to phase change refrigerant charged solar systems, and is more particularly directed to a solar heater comprised of a heat storage structure located interiorly of a building and connected in a closed loop to a refrigerant charged collector positioned exteriorly of the building in exposed relationship to the sun's rays.

Passive solar heating systems as conventionally utilized require that a house or other building have a large southern exposure of glass. With a system of this type, radiation from the sun enters through the glass, and gives up its heat to a storage material, which may be a masonry wall, a floor, or tanks containing a storage fluid. Relative simplicity of construction, and relatively little maintenance and low operational costs generally characterize such systems.

However, prior art passive solar heating systems of this type also suffer from a number of disadvantages. First of all, the house must be especially built to have a large glass area facing south. Also, the house usually must be overheated in the daytime in order to store heat for the night. Heat is thereby transferred into storage through the surface of the storage medium, hereby the hot surface picks up less of the available heat and also reflects heat into the surrounding area. Further, the glass area must be closed off and insulated whenever heat is not entering the house, or otherwise desirable heat will be lost. In addition, with the earlier system just described, there is little adaptability to a retrofit system.

SUMMARY OF THE INVENTION

Applicant has effectively overcome the foregoing and other apparent disadvantages of the described prior art solar heating system by provision of a solar heater comprising, in combination, a refrigerant changed collector positioned exteriorly of the house or other building in exposed relationship to the sun's rays, and a heat storage structure located interiorly of the building and connected in a closed loop to the collector. Importantly, in order to assure high performance of the present system, an accumulator is provided between the top of the collector and top of the heat storage structure, in a passive system. In an active system, also to be described herein, an accumulator is located between pump means and the bottom of the heat storage structure. In both systems, it is important to prevent the passage of liquid refrigerant directly from the collector to the heat storage unit or heat exchanger.

In operation of the present invention, the refrigerant in the collector is caused to boil due to the heat of the sun. The gaseous refrigerant is passed to the heat storage structure, where it is condensed. From the heat storage structure, liquid is returned to the collector. Desirably, the heat storage structure is controllably insulated so that it gives up heat to the building only at selected times, as a night, and retains or stores heat at other selected times, as during the daytime during periods of bright sunlight. Also desirably, fan means may be provided to circulate air or fluid around or through the heat storage structure.

DESCRIPTION OF THE PREFERRED EMBODIMENT

Figure 1:
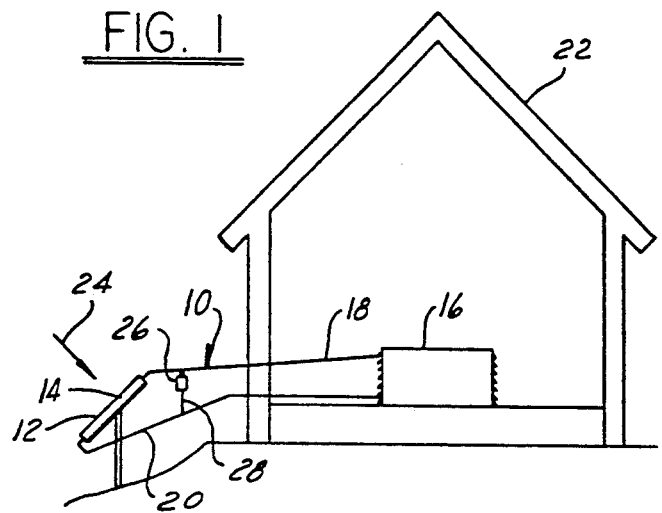
FIG. 1 is a diagrammatic representation of a solar heating system of the passive type embodying the novel concepts of the present invention.

Referring now first to FIG. 1 of the drawings, a passive phase change refrigerant charged solar system provided by applicant is designated generally by the legend S-1. The system is comprised of a collector 10 supported by mounting means 12 exteriorly of building 14, and angularly positioned as shown for maximum exposure to the sun's rays R. The collector 10 is changed with refrigerant of the low vapor pressure type, and the collector 10 at the top thereof is connected by conduit means 16 to the top of heat storage structure 18. Conduit means 20 connects the bottom of collector 10 to the bottom of heat storage structure 18. As shown, the collector 10 located outside building 14 is disposed below the level of interiorly located heat storage structure 18 in order to provide a truly passive system, and a generally recommended vertical distance therebetween is approximately fifteen inches. By so locating these components of applicant's invention, gaseous refrigerant from the collector 10 flows passively through conduit means 16 to the heat storage structure or unit 18, and liquid refrigerant passes through heat storage structure 18 and back to collector 10 through conduit means 20 under gravitational forces.

It has been found that performance of the solar heating system of this invention, both the passive and active phase change types, may be maximized by provision of an accumulator in the system. This novel approach has the desirable effect of permitting only dry saturated refrigerant to move to the heat exchanger, or as may be otherwise stated, preventing the passage of liquid refrigerant directly from the collector to the heat storage unit.

With continued reference to FIG. 1, accumulator 22 is located proximate to or at the top of the collector 10 and closely adjacent or at the top of the heat exchange structure 18 connecting with conduit means 16. Conduit means 24 connects accumulator 22 to conduit means 20. In this manner, liquid refrigerant is preventing from passing directly from the collector 10 to the heat storage unit 18, and liquid refrigerant trapped in the accumulator 22 is returned to the collector 10 through conduit means 24 and 20. The specific construction of the accumulator 22 may vary, depending upon the design and operation of the solar heating system, and an exemplary form of accumulator is shown in my U.S. Pat. No. 3,872,689. In like manner, structural details of the collector 10 may vary, and an illustrative solar collector construction is shown in my U.S. Pat. No. 4,026,272.

Figure 2:
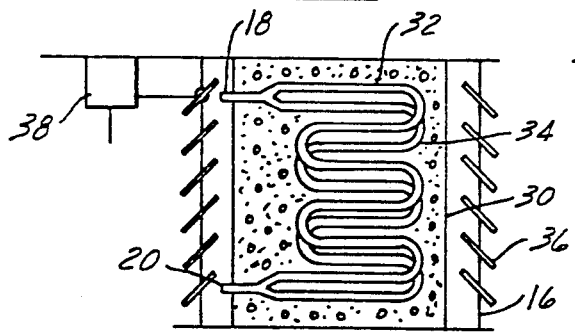
FIG. 2 is a view showing diagrammatically one form of heat storage structure provided by applicant.

Referring now to FIG. 2 of the drawings, one exemplary form of heat storage structure or unit 18 is shown therein. The unit 18 may be constructed to include a tank or container 30 having a wall structure 32 of masonry or like materials, wherein there is embedded a plurality of parallel spaced coils 34 and 36 of serpentine or helical configuration. Only a pair of parallel coils 34 and 36 are shown in the illustrative embodiment of FIG. 2, although this may vary. The parallel arrangement of coils provides the requisite condensing surfaces, and it will be further understood that the coils 24 and 36 must be so mounted that condenses refrigerant will not be trapped, but will drain freely.

In order to control the amount of heat made available to the interior of the building 14, the masonry wall structure 32 of the heat storage unit 18 preferably mounts thereon insulated louvers 38. The louvers are effective when in closed position to store heat in the masonry wall structure 32, and when in open position, the louvers permit heat to be radiated from wall structure 32 to heat the interior of building 14. The louvers 38 may be manually activated, or the opening and closing thereof may be under control of temperature responsive means 40. If desired, heating of the interior of the house or building 14 may be facilitated when the louvers 38 are in open position by air circulated by fan means 42.

Figure 3:
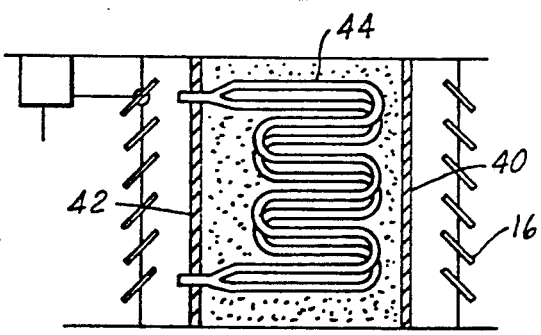
FIG. 3 is a diagrammatic representation of another form of heat storage structure.

Another form of heat storage structure 18 within the preview of this invention is shown in FIG. 3. In this embodiment applicant has provided a tank or vessel 50 of steel or like materials containing therewithin a body 52 of heat storage material exemplified by water, sand, or salt. Arranged within and surrounded by the heat storage material or matrix 52 is a plurality of parallel spaced costs 54 and 56 of helical or serpentine configuration. As indicated in connection with FIG. 2, the number of coils 54 and 56 may vary. Also, the conduit connections 16a and 20a to the top and bottom of the heat storage unit 18 of FIG. 3 are essentially identical to like parts in FIGS. 1 and 2. As well, the louvers 38a in FIG. 3 may be structurally and functionally the same as like parts in FIG. 2.

Figure 4:
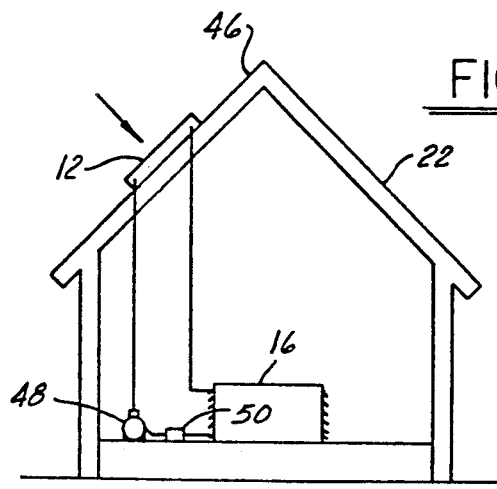
FIG. 4 is a view similar to FIG. 1, and showing a solar heating system of the active type constructed in accordance with the instant invention.

The novel concepts of the present invention are also applicable to a solar heating system of the active phase change type, and this is illustrated in FIG. 4. In this embodiment, building 60, which may be a house or other dwelling, mounts on the roof portion 60a thereof a collector 62 angularly disposed so as to derive maximum exposure to sun's rays R. Collector 62 at essentially the top thereof is connected to the top of heat storage unit 16a by conduit means 64, and conduit means 66 connects the bottom of the collector 62 to the bottom of heat storage structure 16a. Positioned within the conduit means 66 is pump means 68 and an accumulator 70, and if desired, fan means 42a may be provided as earlier described in connection with FIG. 1. The construction of the collector 62 and accumulator 70 may be substantially the same as like parts indicated by the numerals 10 and 22, respectively, in FIG. 1.

In operation of the active phase change system S-2 of FIG. 4, hot refrigerant vapor moves passively by its own vapor pressure from collector 62 through conduit means 64 to heat storage unit 16a, where it condenses and gives up its heat. Condensed (liquid) refrigerant under action of pump means 68 is caused to move through conduit means 66 to the collector 62. Accumulator 70 functions importantly, as earlier described, to assure that only dry saturated refrigerant moves to the heat exchanger (heat storage unit 16a).

It is believed now apparent that by provision of the solar heating system herein disclosed the house can be faced in any direction, and in fact, no windows are required. The present solar heater is ideal for retrofits, heat can be stored without overheating the room, and the system is highly efficient.

These and other highly desirable objectives are achieved through the combination of a refrigerant charged collector positioned exteriorly of a house or other building in exposed relation to the sun's rays, and a heat exchange structure or unit located interiorly of the building and connected in a closed loop to the collector. An important aspect of this novel combination is the provision, in proper positioning between the collector and heat storage unit, of an accumulator which permits only dry saturated refrigerant to move to the heat exchanger.

Various modifications have been noted to the structures herein disclosed, and these changes and other variations may of course be practiced without departing form the spirit of the invention or the scope of the subjoined claims.

I claim:

1. A totally passive type closed solar heating system for a building, comprising a solar collector located exteriorly of the building to be heated at a substantial distance therefrom positioned lower than a heat exchanger located within the building, said solar collector being so positioned to receive substantially maximum radiation from the sun and tilted with respect to the sun so as to be substantially perpendicular to the sun's rays, a heat exchanger which includes a heat storing matrix located within the building to be heated, said heat exchanger being positioned at a level substantially higher than said solar collector, a plurality of spaced apart parallely connected coils supported within said heat exchanger and extending from adjacent the top of said heat exchanger to adjacent the bottom thereof through which a heat transfer medium may pass by gravity, first conduit means extending in a generally upward direction between the top of said solar collector to the top of said coils within said heat exchanger, second conduit means extending in a generally upward direction between the bottom of said solar collector to the bottom of said coils within said heat exchanger, third conduit means connecting said first and said second conduit means, an accumulator connected to said third conduit means and thereby positioned between said solar collector and said heat exchanger for preventing a liquid refrigerant from passing directly from said solar collector to said heat exchanger, and means positioned adjacent said heat exchanger for selectively insulating the same.

* * * * *